(12) United States Patent
Presswood, Jr. et al.

(10) Patent No.: US 7,229,172 B2
(45) Date of Patent: Jun. 12, 2007

(54) EYEGLASSES-RETAINING DEVICE AND METHODS OF USE

(75) Inventors: Ronald G. Presswood, Jr., Houston, TX (US); Kevin Coffey, Pearland, TX (US); Charles O'Hare, Friendswood, TX (US)

(73) Assignee: Low-Tech Improvement Co., L.L.C., Houston, TX (US)

( * ) Notice: Subject to any disclaimer, the term of this patent is extended or adjusted under 35 U.S.C. 154(b) by 0 days.

(21) Appl. No.: 11/237,300

(22) Filed: Sep. 28, 2005

(65) Prior Publication Data

US 2007/0070289 A1    Mar. 29, 2007

(51) Int. Cl.
    *G02C 3/00*    (2006.01)
(52) U.S. Cl. ............... 351/155; 351/52; 351/158; 24/3.3
(58) Field of Classification Search ........... 351/41, 351/51, 52, 112, 155, 158; 24/3.1, 3.3, 3.7, 24/3.8; 2/10, 15
    See application file for complete search history.

(56) References Cited

U.S. PATENT DOCUMENTS

| 2,155,258 | A | 4/1939 | Dennis |
| 2,549,445 | A | 4/1951 | Friess |
| 2,802,250 | A | 8/1957 | Klotz |
| 3,983,602 | A | 10/1976 | Barry |
| 4,179,753 | A | 12/1979 | Aronberg et al. |
| 4,276,657 | A | 7/1981 | Montesi |
| 4,563,066 | A | 1/1986 | Bononi |
| 4,768,231 | A | 9/1988 | Schrack |
| 4,781,451 | A | 11/1988 | McAllen |
| 5,123,724 | A | 6/1992 | Salk |
| 5,289,592 | A | 3/1994 | Paivarinta |
| 5,347,325 | A | 9/1994 | Lei |
| 5,408,728 | A | 4/1995 | Wisniewski |
| 5,794,312 | A | 8/1998 | O'Mahony |
| 5,829,103 | A | 11/1998 | Allen |
| 5,845,369 | A | 12/1998 | Dunchock |
| 5,867,874 | A | 2/1999 | Simpson |
| 5,940,890 | A | 8/1999 | Dallas et al. |
| 5,987,652 | A | 11/1999 | Fowler |
| 6,134,753 | A | 10/2000 | O'Mahony |
| 6,185,748 | B1 | 2/2001 | DeChambeau |
| 6,210,003 | B1 | 4/2001 | Chan |
| 6,237,159 | B1 | 5/2001 | Martin |
| 6,298,495 | B1 | 10/2001 | Totani |
| 6,308,336 | B1 | 10/2001 | Stephenson et al. |
| 6,481,059 | B2 | 11/2002 | Morris |
| 6,668,426 | B1 * | 12/2003 | Morris ..................... 24/3.3 |

FOREIGN PATENT DOCUMENTS

JP        09311300        12/1997

* cited by examiner

*Primary Examiner*—Huy Mai
(74) *Attorney, Agent, or Firm*—Fulbright & Jaworski LLP

(57) ABSTRACT

A eyeglasses retaining device for headware, having a unitary fastener for the headware and the eyeglasses is described. The retaining device may optionally have designs or advertising or other messages on a portion visible to others.

18 Claims, 5 Drawing Sheets

EYEGLASSES-RETAINING DEVICE AND METHODS OF USE

TECHNICAL FIELD

The present invention relates to an eyeglasses, safety glasses, sunglasses retaining device and to methods for making and using the same. The retaining device described herein is applicable to all eyeglass arms (i.e., ear pieces) such that it is universally applicable to all eyeglass styles and designs.

BACKGROUND OF THE INVENTION

Although a number of methods exist for retaining eyeglasses of all varieties, including but not limited to sunglasses, safety glasses or the like (collectively "eyeglasses"), they may require a alteration of the hat or cap, they require the user to slide the ear piece of the glasses into a holder, they are made from multiple materials and/or they non uniform shape. The current art provides for clips that are rectangular or possible t-shaped. The current art will not work with all styles of ear pieces be they wire or plastic.

There is a need in the art for an improved clip design that can be used by all styles of ear piece such as but not limited to wire or plastic, that provides for varies shapes such as but not limited to rectangular, square, round, semi-circular, or oblong.

In U.S. Pat. No. 6,481,059, Morris teaches a substantially planar circular member eye glass fastener, fabricated of resilient plastic material or light weight metal alloy, a composite, a laminate or combinations thereof. The '059 patent teaches that a soft foam or plastic insert is optionally used to contact to the sunglass arm. Without this insert, the planar nature of the Morris fastener renders it inapplicable to various eyeglass designs, as the fastener will not optimally grip both thin- and thick-eyeglass arms. Additionally, the insert has the potential to deform over time, taking the shape of the eyeglasses used in it such that it becomes other less-than-optimal or entirely not useful for other eyeglass types.

In U.S. Pat. No. 6,668,426, Morris teaches eye glass holders for securing to hats or fabric. The '426 fastener is similar to that in the '059 patent, one difference being that the '426 device comprises a fixed fastener design, wherein said fastener design has a broad Y-shaped insertion point. However, the design disadvantages of the '059 patent remain, namely, that the insert material is needed to accommodate all eyeglass types.

In U.S. Pat. No. 5,867,874, Simpson discloses an implement holder to be attached to a cap or hat. The holder has the general shape of an U-shaped channel. The members which immobilize the pencil in the '874 patent are substantially planar and are thus suffer from the same disadvantage of the '059 patent of Morris. As a result, the '874 device is not amenable to accommodate pencils of different sizes. The pencil holder of Allen described in U.S. Pat. No. 5,829,103 uses the same U-shape geometry. The Allen device suffers from the disadvantage that it is limited to use with objects having the size of a standard pencil. Objects appreciably smaller would not be held in place while those appreciably larger would likely not fit. Again, these devices fail to accommodate objects having variable shapes and sizes.

Thus there is a need in the art for an improved clip design that can be used by all styles of ear piece such as but not limited to wire or plastic, that provides for varies shapes such as but not limited to rectangular, square, round, semi-circular, or oblong.

BRIEF SUMMARY OF THE INVENTION

In one aspect of the present invention, there is a retaining device to retain eyeglasses to a piece of headwear, said retaining device comprising: a disk-shaped, substantially circular member, said substantially circular member having an substantially convex exterior surface and a substantially concave interior surface; a clamping member disposed on said circular member and positioned to bear against said substantially concave interior surface when the earpiece of said eyeglasses is positioned between said clamping member and said substantially concave interior surface.

Preferably, the retaining device comprises plastic. In some embodiments, the retaining device comprises polyethylene. The retaining device of claim 1, wherein at least a portion of said substantially concave interior surface comprises a non-smooth surface. In some embodiments having a substantially concave interior surface which is non-smooth, the non-smooth surface comprises serrated teeth. In some embodiments having a substantially concave interior surface which is non-smooth, the non-smooth surface comprises at least one vertical ridge of material running length-wise with respect to said clamping member. In some embodiments, the device is used with eyeglasses that are sunglasses. In some embodiments, the device is used with eyeglasses that are safety glasses. In some embodiments, the device is used with eyeglasses that are prescription eyeglasses. In some embodiments, the substantially convex exterior surface comprises advertising, trademarks, ornamental structure, artistic designs, sports team logos, professional sports league logos, commercial designs, or any combination thereof.

In another embodiment of the present invention, there is a method of retaining eyeglasses onto a pieces of headware, said method comprising affixing a retaining device, said retaining device comprising a disk-shaped, substantially circular member, said substantially circular member having an substantially convex exterior surface and a substantially concave interior surface; and, at least one clamping member disposed on said circular member and positioned to bear against said substantially concave interior surface when the earpiece of said eyeglasses is positioned between said clamping member and said substantially concave interior surface; said step of affixing comprising positioning a portion of said headware between said at least one clamping member and said disk-shaped, substantially circular member; and, positioning the ear piece of said eyeglasses between said at least one clamping member and said disk-shaped, substantially circular member. In some embodiments of the method, one or both of said step of affixing a retaining device and said step of positioning the ear piece comprise clamping with said clamping member. In some embodiments of the method, the eyeglasses are sunglasses. In some embodiments of the method, the eyeglasses are safety glasses. In some embodiments of the method, the eyeglasses are prescription eyeglasses. In some embodiments of the method, the headware is a cap. In some embodiments of the method where the headware is a cap, the cap is a baseball cap.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

As used herein, "a" or "an" means one or more than one. The singular encompasses the plural and the plural encompasses the singular.

As used herein with respect to the eyeglasses retaining device, the term "interior" when used in the context of a surface of the device means that surface which is in contact with the headware. As used herein with respect to the eyeglasses retaining device, the term "exterior" when used in the context of a surface of the device means that surface which is not in contact with the headware and which is exposed and in view when the device is being worn.

The present invention relates to a devise to retaining eye glasses when placed on a hat or cap worn on the head and a shape that allows for manufacture of the device with an external appearance that can be any shape, such as but not limited to round, square, rectangular, ovoid or similar, the device will accept any styles of earpiece such as but not limited to wire or plastic, that provides for varies shapes such as but not limited to rectangular, square, round, semi-circular, or oblong. The sectional shape of the device is preferably semi-circular, which is designed to retain the clip to the hat or cap when not in use, as well as retain the earpiece of the glasses when in use. The exposed external surface is designed in such as manner as to allow for the surface to be used for marketing, advertising, or to comprise other artistic or commercial material. The eyeglasses that can be used with the present invention are not limited to any particular variety, non-limiting examples of which include prescription eyeglasses, reading eyeglasses, sunglasses, safety glasses, etc. As used herein, "eyeglasses" is defined broadly, and encompasses all these varieties.

Figure 1:
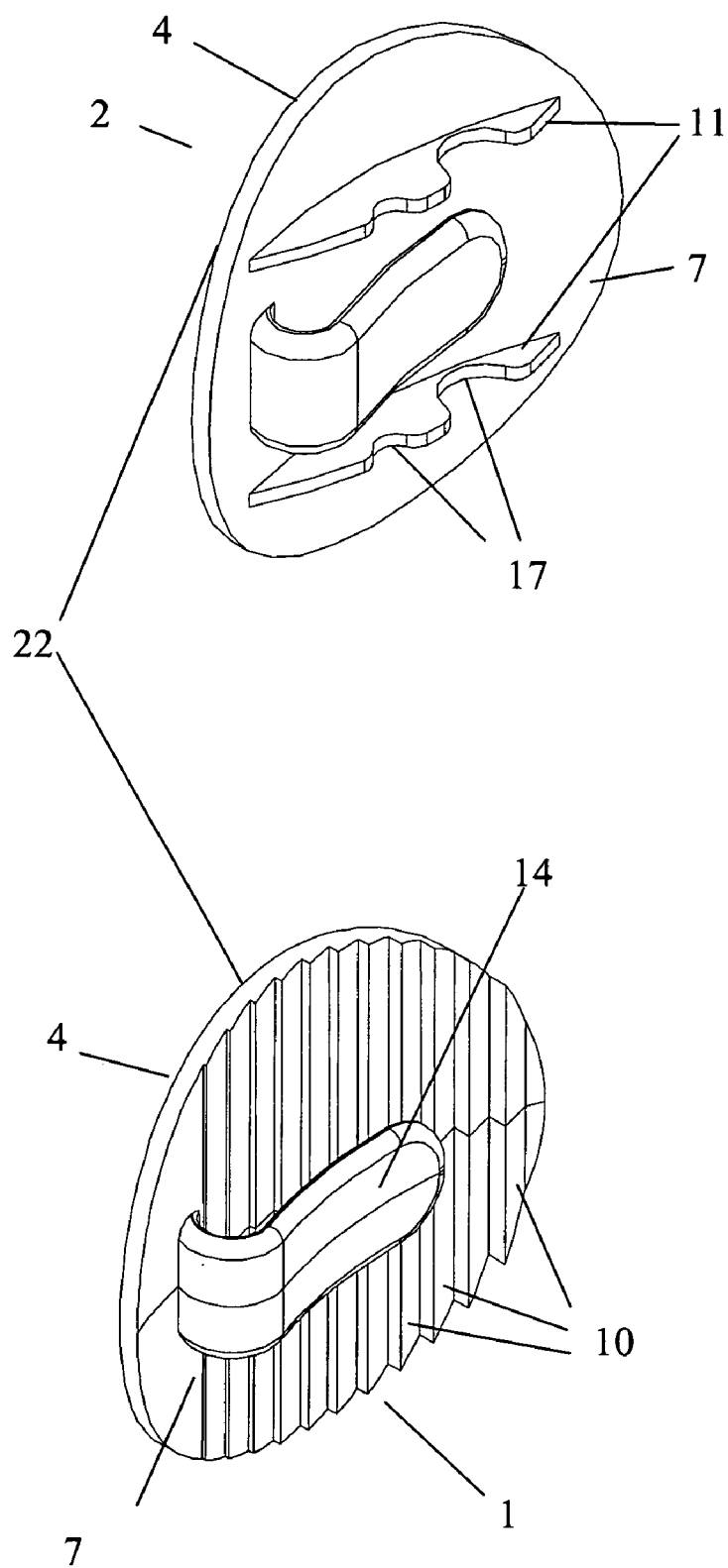
FIG. 1 illustrates detailed views of two embodiments of the eyeglasses-retaining device of the present invention.

FIG. 1 provides a detailed view of two embodiments (denoted as 1 and 2) of the eyeglasses-retaining device of the present invention. The retaining device preferably comprises a disk-shaped, substantially circular member 4. The view of the illustrated embodiments show the substantially concave interior surface of the device 7. The substantially concave interior surface of the device 7 preferably has a non-smooth surface, but in alternative embodiments this surface may be smooth. In the embodiment designated as 1, the substantially concave interior surface comprises serrated teeth 10. A clamping member, designated as 14, is disposed on the circular member 4. The serrated teeth 10, work together with the clamping member 14, to immobilize the earpiece of the eyeglasses. In the embodiment designated as 2, the substantially concave interior surface 7 comprises two vertical ridges of material 11 running length-wise with respect to said clamping member 14. The vertical ridges have cut-away regions 17, which, in cooperation with an opposing force from the clamping member 14 immobilize the earpiece of the eyeglasses. The exterior surface, opposite the substantially concave interior surface 7, is a substantially convex exterior surface 22. The substantially convex exterior surface 22 is preferably a smooth surface, but alternatively, this surface may be non-smooth. While "smooth" and "non-smooth" are relative terms, as used herein, "smooth" means substantially free of irregularities, roughness, or projections. While there may be curvature to a smooth surface to create a substantially concave or substantially convex surface, such a surface would still be smooth as that term is used herein. "Smooth" as that term is used herein covers that which is smooth to the touch, such that one may apply a sticker or decal to the surface easily. By contrast, a "non-smooth" smooth surface would not have these properties.

Figure 2A:
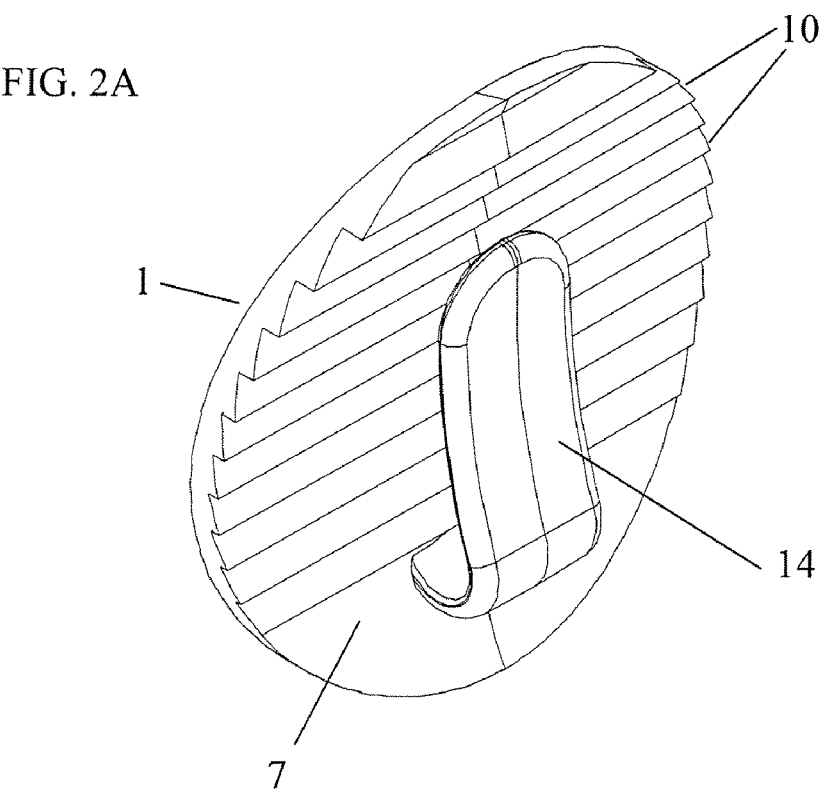
FIG. 2 illustrates two view of one illustrative embodiment showing a frontal view (FIG. 2A) and a side view (FIG. 2B).
Figure 2B:
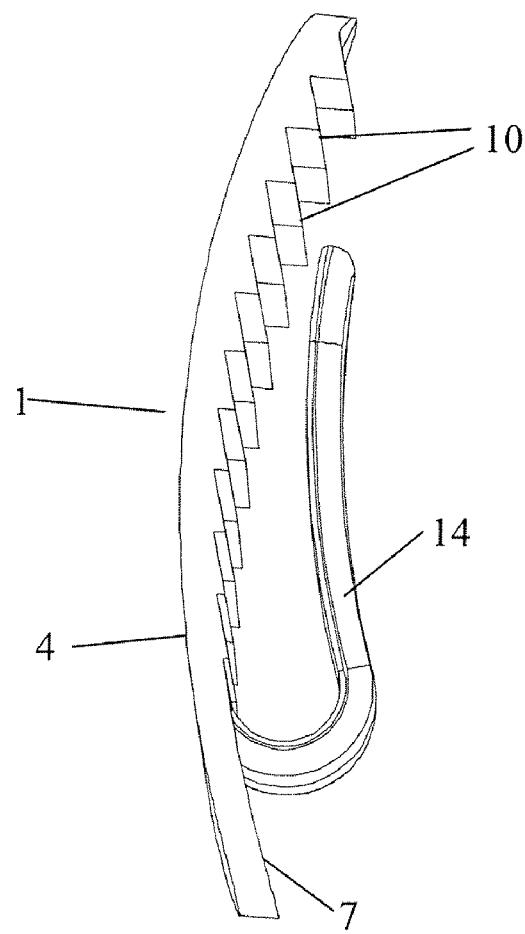
Figure 3:
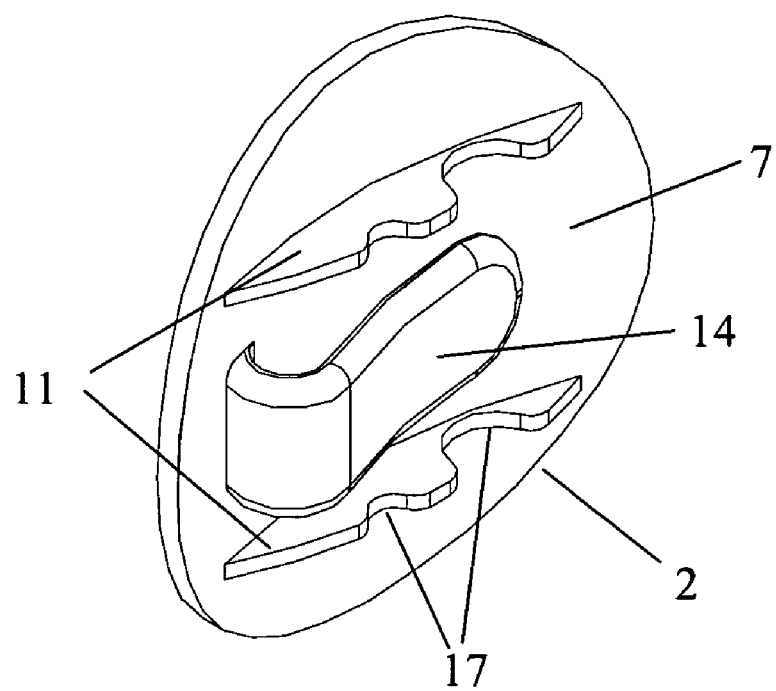
FIG. 3 illustrates an additional view of another illustrative embodiment.

FIG. 2 provides two additional views of the embodiment designated as 1, including a frontal view illustrating the substantially concave surface 7, shown as FIG. 2A, while a side view is shown as FIG. 2B. FIG. 3 provides an additional view of the embodiment designated as 2. It should be understood that these two embodiments are merely illustrative and not exhaustive, other embodiments are possible which incorporate the basic elements of the device.

Owing to its structure, the eyeglasses-retaining device of the present invention offers simplicity over the devices of the prior art. The clamping member serves to immobilize the eyeglasses as well as to affix the device to the headware. In this way, the device has a unitary construction not seen in the prior art, which typically is characterized by a different means for fixation to the headware and for fixation of the eyeglasses to the device. In the preferred embodiment and as illustrated in the drawings, there is one clamping member 14 that is positioned in the center of the substantially concave interior surface 7. However, the clamping member 14 may be positioned off-center. While this may not result in optimal fixation of the device on the headware or of the eyeglasses on the device, it may be sufficient. Alternatively, there may be multiple clamping members on the substantially concave interior surface 7. Again, multiple clamping members is not the preferred embodiment, it is an embodiment that may be useful in some cases.

As will be apparent to those of ordinary skill in the art, that the eyeglasses retaining device of the present invention is preferably formed of resilient plastic material that is sufficiently stiff to resiliently provide lateral support to the headware upon engagement of the eye glasses to the clip. Preferably, it comprises polyethylene. Although plastic is preferred, it should be understood that the eyeglasses-retaining device can be made of any material. It is contemplated to be within the scope of the invention to have the clip made from a lightweight metal alloy, or composite of plastic and metal alloy. However, the eyeglasses retaining device needs to be sufficiently deformable to allow the device to slip onto and off of, the headware and for the eyeglasses ear piece to be engaged and disengaged quickly and easily. It is also contemplated that an cord or other tether can be used to hold the arm of the eyeglasses and remain within the scope of the invention, in place of the fastener.

Figure 4:
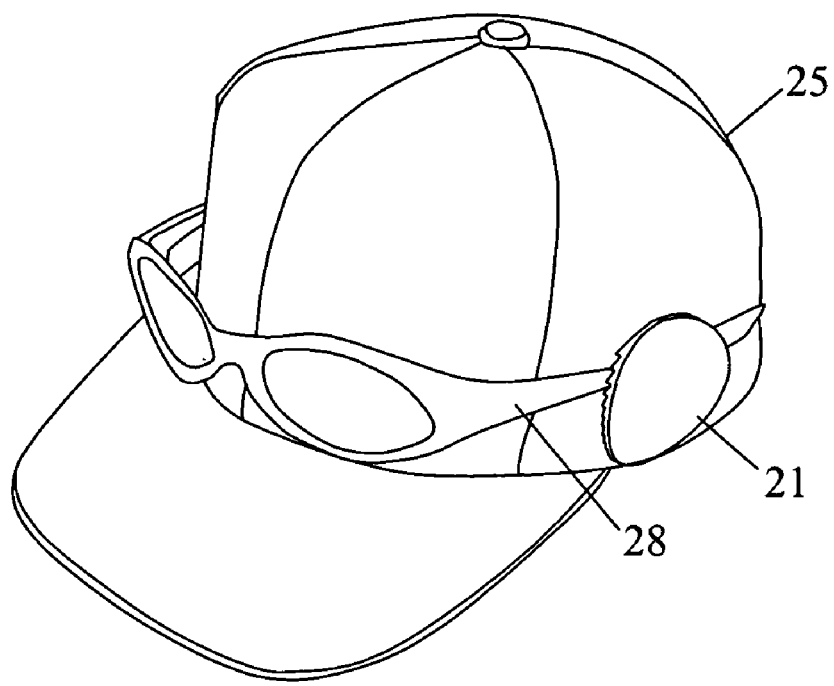
FIG. 4 illustrates a view of the eyeglasses-retaining device on a hat with eyeglasses.

FIG. 4 illustrates the arrangement of an eyeglasses-retaining device 21 disposed upon a hat 25 for holding eyeglasses 28 (in this case, sunglasses). It is expected that many types of hats could be used with the retaining device design of the present invention. In the preferred embodiment, the eyeglasses retaining device of the present invention is used with baseball caps or similar caps and headware.

Figure 5:
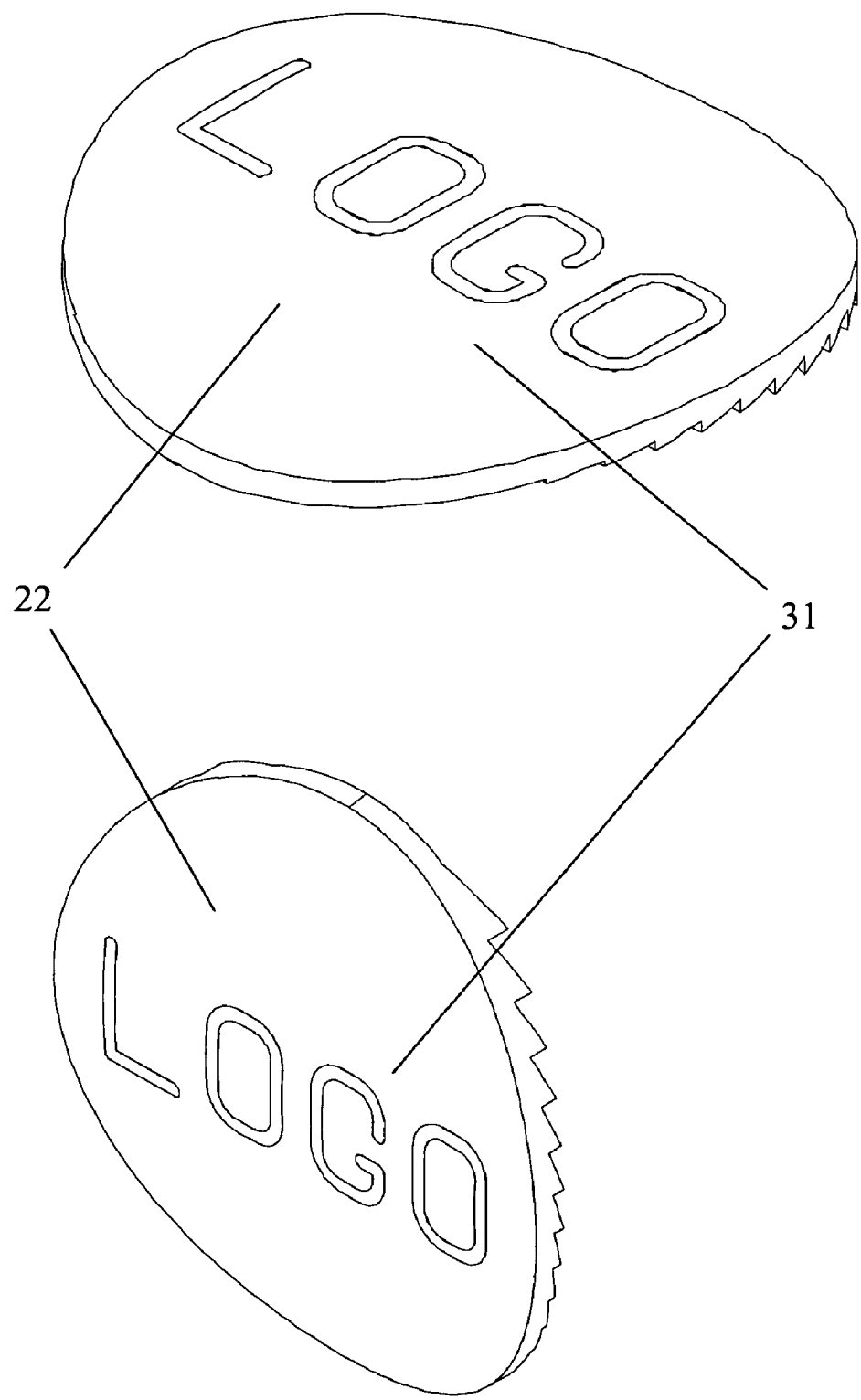
FIG. 5 illustrates a view of the eyeglasses retaining device showing the substantially convex exterior surface.

FIG. 5 shows the substantially convex exterior surface 22 of the device. The exterior surface is exposed and can be seen by other people when the device is being worn. In some embodiments, a portion or all of the exterior surface can include, advertising, trademarks, ornamental structure, designs, patterns or other artistic or commercial representations. For example, it may bear the name or logo of profession sports teams or leagues or the name of athletic equipment or clothing companies. The logo 31 is illustrated in FIG. 5.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. A retaining device to retain eyeglasses to a piece of headwear, said retaining device comprising:
   a disk-shaped member, said disk-shaped member having an substantially convex exterior surface and a substantially concave interior surface; and,
   at least one clamping member disposed on said disk-shaped member and having a surface positioned to bear against said substantially concave interior surface when an earpiece of said eyeglasses is positioned between said clamping member and said substantially concave interior surface, said surface of said clamping member having a convex radius of curvature.

2. The retaining device of claim 1, wherein said retaining device comprises plastic.

3. The retaining device of claim 2, wherein said retaining device comprises polyethylene.

4. The retaining device of claim 1, wherein said retaining device comprises a lightweight metal alloy.

5. The retaining device of claim 1, wherein said retaining device comprises a composite of plastic and metal alloy.

6. The retaining device of claim 1, wherein at least a portion of said substantially concave interior surface comprises a non-smooth surface.

7. The retaining device of claim 6, wherein said non-smooth surface comprises serrated teeth.

8. The retaining device of claim 6, wherein said non-smooth surface comprises at least one vertical ridge of material running length-wise with respect to said clamping member.

9. The retaining device of claim 1, wherein said substantially convex exterior surface comprises advertising, trademarks, ornamental structure, artistic designs, sports team logos, professional sports league logos, commercial designs, or any combination thereof.

10. A method of retaining eyeglasses onto a pieces of headware, said method comprising:
    affixing a retaining device, said retaining device comprising
       a disk-shaped member, said disk-shaped member having an substantially convex exterior surface and a substantially concave interior surface; and,
       at least one clamping member disposed on said disk-shaped member and having a surface positioned to bear against said substantially concave interior surface when an earpiece of said eyeglasses is positioned between said clamping member and said substantially concave interior surface, said surface of said clamping member having a convex radius of curvature;
    said step of affixing comprising positioning a portion of said headware between said at least one clamping member and said disk-shaped, substantially circular member; and,
    positioning the ear piece of said eyeglasses between said at least one clamping member and said disk-shaped, substantially circular member.

11. The method of claim 10 wherein one or both of said step of affixing a retaining device and said step of positioning the ear piece comprise clamping with said clamping member.

12. The method of claim 10, wherein said eyeglasses are sunglasses.

13. The method of claim 10, wherein said eyeglasses are safety glasses.

14. The method of claim 10, wherein said eyeglasses are prescription eyeglasses.

15. The method of claim 10, wherein said headware is a cap.

16. The method of claim 15, wherein said cap is a baseball cap.

17. The retaining device of claim 1, wherein said disk-shaped member is substantially circular.

18. The method of claim 10, wherein said disk-shaped member is substantially circular.

* * * * *